United States Patent [19]
Hurko

[11] 3,971,361
[45] July 27, 1976

[54] LOW THERMAL MASS COOKING UTENSIL
[75] Inventor: Bohdan Hurko, Louisville, Ky.
[73] Assignee: General Electric Company, Louisville, Ky.
[22] Filed: July 15, 1974
[21] Appl. No.: 488,526

[52] U.S. Cl. .................. 126/390; 206/818
[51] Int. Cl.² .......................... A47J 27/00
[58] Field of Search ............ 126/390, 400; 220/66, 220/70, DIG. 14, 64; 165/185; 215/1 C; 206/818 X; 117/94, 160; 428/422

[56] References Cited
UNITED STATES PATENTS

| | | | |
|---|---|---|---|
| 1,386,303 | 8/1921 | Armstrong | 126/390 |
| 2,982,440 | 5/1961 | Harrison | 220/66 |
| 3,304,221 | 2/1967 | Eggleton | 428/422 |
| 3,315,285 | 4/1967 | Farmer | 117/94 |
| 3,322,113 | 5/1967 | Simjian | 126/390 |
| 3,593,702 | 7/1971 | Zigomalas | 126/390 |
| 3,610,459 | 10/1971 | Hanson | 206/818 |
| 3,730,383 | 5/1973 | Dunn et al. | 220/66 |

*Primary Examiner*—Kenneth W. Sprague
*Assistant Examiner*—Larry I. Schwartz
*Attorney, Agent, or Firm*—Richard L. Caslin; Francis H. Boos

[57] ABSTRACT

A lightweight cooking utensil with raised side walls and a high temperature flexible plastic sheet stretched across the bottom portion of the side walls and sealed thereto to form a leak-proof container. The utensil is adapted to be heated on a low energy, low temperature solid plate surface heating unit with a slight convex top surface so that the plastic sheet of the utensil will conform to the top surface and make a highly efficient thermal coupling.

19 Claims, 2 Drawing Figures

LOW THERMAL MASS COOKING UTENSIL

BACKGROUND OF THE INVENTION

1. Field of the Invention:

The invention relates to cooking utensils of lightweight and hence of low thermal mass.

2. Description of the Prior Art:

The principal materials used for cooking utensils today are medium-weight aluminum, cast iron, enamelware, glass, heat-proof glass-ceramic and stainless steel. The medium-weight aluminum utensils are the most popular because they heat evenly and quickly. The cast iron utensil if heated slowly will give satisfactory results. The enamelware utensil should only be used on low or medium heat because under certain conditions the enamel finish may tend to soften. Glass utensils also should be used only on warm, low or medium heat settings because the utensils may break with sudden temperature changes. Glass manufacturers recommend a wire grid when using glass on electric surface units. The heatproof glass-ceramic utensils distribute heat slowly and cool slowly so that only the lower heats are recommended. The stainless steel utensils are usually combined with copper, aluminum or other metals for improved heat distribution, but again they work best if used at a medium heat.

One disadvantage with cooking utensils is that in time the bottom wall tends to become warped due to uneven temperature distribution. In the United States, the most common type of electrical surface heating means is the metal sheathed electrical resistance heating element of coiled configuration. These sheathed type heaters have at best a small contact area with the utensil bottom wall, even when both the surface unit and the utensil bottom wall are reasonably flat. The surface unit coils may also become warped due to the high temperatures and the many years they are kept in service. Hence, they may become poor performers even with a utensil with a flat bottom wall.

To offset these possibilities of poor thermal coupling between the sheathed type surface unit and a cooking utensil, the surface units are operated at very high temperatures, up to about 1600°F., at wattages that may approach 3000 watts. This high temperature high energy surface cooking system of today has been deemed necessary (1) to make cooking possible in a utensil which has a very poor thermal coupling with the surface heating unit, and (2) the sheathed type heaters have a small contact area with the utensil bottom wall. Hence, the heater temperature is brought up to temperatures as high as 1600°F in order to bring food temperatures to a temperature only between 212°F and about 450°F. At about 450°F meat starts to char badly, and all frying operations may be performed at temperatures below about 450°F.

The principal object of the present invention is to provide a low thermal mass cooking utensil with a flexible bottom wall that will have optimum thermal coupling capability with a surface heating means so as to enable the use of low energy surface heating means.

A further object of the present invention is to provide a cooking utensil of the class described with a high temperature flexible plastic bottom wall which is capable of conforming to the top surface of a surface heating means to obtain optimum thermal coupling.

A further object of the present invention is to provide a low thermal mass cooking utensil so as to permit the use of a low energy surface heating means and obtain a high thermal efficiency based upon the heat output of the surface heating means and the resulting heat input into the food placed in the cooking utensil.

SUMMARY OF THE INVENTION

The present invention, in accordance with one form thereof, relates to a low thermal mass cooking utensil with raised side walls of lightweight material and a high temperature flexible plastic sheet sealed across the bottom portion of the side walls to form a leak-proof container for cooking purposes. The bottom wall is capable of conforming to a surface heating means on which it is supported for optimum thermal coupling purposes.

BRIEF DESCRIPTION OF THE DRAWINGS

This invention will be better understood from the following description taken in conjunction with the accompanying drawings and its scope will be pointed out in the appended claims.

DESCRIPTION OF THE PREFERRED EMBODIMENT

Figure 1:
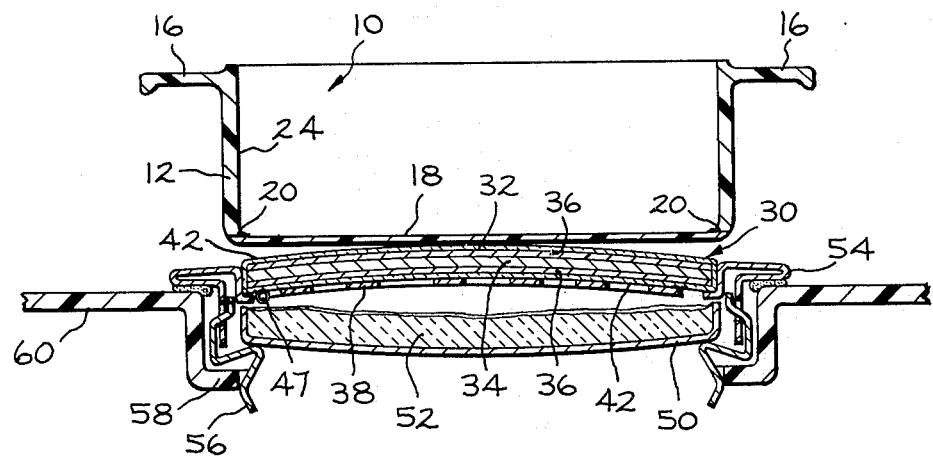
FIG. 1 is a fragmentary cross-sectional elevational view through a low thermal mass cooking utensil embodying the present invention. This cooking utensil is shown supported on a low energy, low thermal mass solid plate surface heating unit that is in turn supported in an opening in a cooktop.

Turning now to a consideration of the drawings and in particular to FIG. 1, there is shown a low thermal mass cooking utensil 10 embodying the present invention. This utensil has generally raised side walls 12 of lightweight material, such as a foamed urethane material which is formed with an open bottom wall and a pair of oppositely arranged handle portions 16 near the top of the side walls. The open bottom wall is adapted to be closed by a high temperature flexible plastic sheet 18 which is tightly stretched across the bottom of the utensil and sealed to the side walls as at 20 so as to form a leak-proof container. High temperature adhesives, such as silicone, are available which may successfully withstand temperatures as high as 700°F, and they may be used to attach the plastic sheet 18 to the side walls 12 of the utensil.

One suitable material for the flexible plastic bottom wall 18 is a fiber glass cloth that is impregnated with polytetrafluoroethylene, which is widely sold under the trademark Teflon. In fact, the inner surface 24 of the side walls could also be coated with Teflon so that the inner appearance of the utensil would be very similar to Teflon coated saucepans and frying pans available on the market today. The Teflon resin material presents a non-stick coating from which it is easy to clean the food soils and grease that may remain in the utensil after the food is emptied from the utensil.

There are other high temperature plastic materials available which have similar characteristics to the Teflon coated fiber glass cloth 18, such as a polyimide, aromatic polyester, polyphenylene sulfide and polyacryl sulfone. Traditionally, cooking utensils are manufactured of rigid metals with rigid bottom walls and there might be some market resistance to this invention at the beginning. The outer surface of the side walls 12 could be metallized so that it presents the appearance of metal such as aluminum so that this new utensil would look almost the same as present day utensils although it would be noticeably lighter in weight when it is held in the hand.

One improvement that could be added to this utensil is to distribute magnetic particles of barium ferrite or the like through the plastic bottom wall 18 so that the bottom wall would be attracted to any metallic surface unit and give a good thermal coupling action between the heating means and the utensil. Refrigerator door gaskets have similar magnetic particles for making a good sealing action.

The molded urethane material for the side walls 12 could be replaced by a very thin aluminum material of a thickness of about 0.050 inches. This aluminum side wall would also be lightweight and have nearly the same low thermal mass as the urethane material mentioned above.

This invention of a low thermal mass cooking utensil 10 is shown combined with a low thermal mass solid plate surface heating unit 30. This heating unit 30 has a thin, lightweight top plate 32 formed of composite metal having an inner core 34 of high thermal conductivity such as copper, silver or aluminum for distributing the heat rapidly over the entire place so as to obtain generally uniform temperature distribution. This copper core 34 is of small thickness, on the order of 0.040 inches, and it needs to be reinforced. This core 34 is provided with an outer skin 36 which serves to reinforce the center core and prevent oxidation and corrosion. This outer skin 36 is selected from a group comprising stainless steel, nickel and chromium.

Again to hold down the thermal mass of this surface heating unit 30, the heat source is represented by a narrow continuous heater strip of film 38 using multiple film layers of noble metals such as gold and platinum as is taught in my earlier Patent No. 3,067,315 entitled, "Multi-Layer Film Heaters in Strip Form." Of course, it is necessary to insulate the film heater 38 from the composite metal plate 32, and this is accomplished by coating at least the bottom surface of the plate 32 with an enamel coating 42 of high electrical resistivity. For purposes of appearance as well as economy it is also well to coat the top surface of the composite plate 32 with a decorative protective coating. Hence, the preferred embodiment of this solid plate surface unit 30 has the same enamel coating 42 on both the top and bottom surfaces of the composite plate 32.

Figure 2:
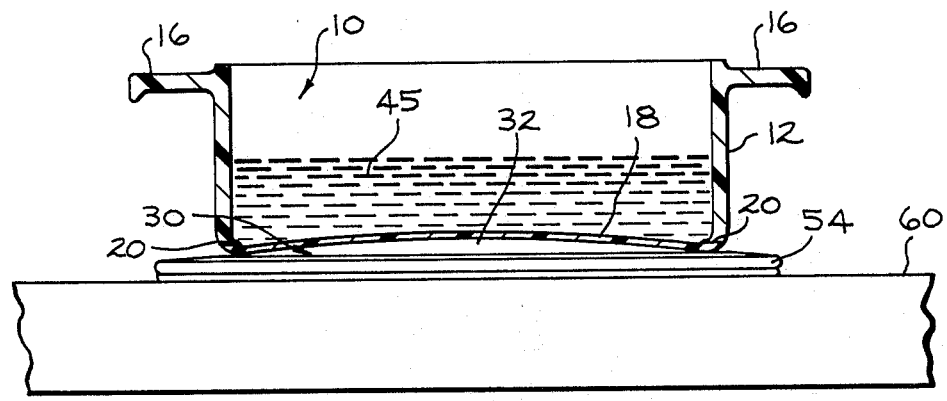
FIG. 2 is a view similar to that of FIG. 1 showing the cooking utensil partially filled with a liquid to be heated, and depicting the manner in which the flexible bottom wall of the utensil flexes and conforms to the convex top surface of the solid plate surface heating unit.

It is well to provide some means for reinforcing this composite plate 32 so that when it is heated it will not tend to buckle or warp. This need is satisfied by forming the composite plate 32 into a slight covex formation as shown in FIG. 1, on the order of 0.050 of an inch. This curvature is advantageous for another reason in that it tends to cooperate with the flexible nature of the bottom wall 18 of the cooking utensil 10 such that when the utensil is furnished with the food or liquids 45 to be cooked as seen in FIG. 2 the added weight of the utensil causes the flexible bottom wall 18 to flex and conform to the curvature of the top surface of the composite plate 32 of the surface heating unit 30 so as to obtain a maximum thermal coupling action between the heating unit 30 and the cooking utensil 10.

It is important to limit the operating temperature of the composite plate to a temperature below about 500°F. This can best be done by introducing a temperature-limiting means to the surface unit 30 such that the power to the film heater 38 is cut off if the temperature of the composite plate 32 rises to a predetermined temperature of about 500°F. This temperature-limiting means may comprise a temperature sensor 47 in the form of an elongated bulb which is positioned outside the outermost coil of the film heater 38 and held against the underside of the composite plate 32. This sensor 47 may be filled with a high temperature thermostatic fluid, such as sodium potassium (NaK) or the like. The sensor 47 would communicate with a temperature responder (not shown) by means of a capillary tube (not shown), as for example as shown in my Plate U.S. Pat. No. 3,622,754 entitled "Glass Plate Surface Heating Unit With Even Temperature Distribution."

The composite plate 32 is shown combined with a reflector pan 50 which underlies the plate and includes a layer of thermal insulating material 52 for reflecting much of the heat from the film heater 38 in an upwardly direction toward the composite plate 32. The surface unit 30 is provided with a trim ring 54 and a plurality of hold-down spring clips 56 which engage in the trim ring and cooperate with a recessed ledge 58 of a cooktop 60. This surface heating unit 30 does not form part of the present invention; therefore, all of its details are not described here in order to concentrate attention on the low thermal mass cooking utensil 10 of the present invention.

Having described above my invention of a low thermal mass cooking utensil, it will readily be apparent to those skilled in this art that such a utensil would have a high thermal efficiency, especially when combined for use with a low thermal mass, low energy solid plate surface heating unit because both the utensil and the heating unit will have fast heat-up and cool-down response rates approaching that of solid state induction surface heating systems as taught in U.S. Pat. No. 3,814,888. The use of the present invention will permit the advent of low temperature because the amount of stored heat in the heating unit or in the cooking utensil is greatly reduced. This low temperature, low energy cooking system will provide a cool cooktop surface 60 such that new low cost plastic materials such as polyethersulfone polyphenylene sulfide and polyesters with fiber glass fillers and a urethane surface coating may be substituted for the present day porcelain enameled steel cooktops.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed as new and desired to be secured by Letters Patent of the U.S. is:

1. A low thermal mass cooking utensil for surface cooking comprising generally raised side walls and a high temperature resilient plastic sheet that is stretched taut and sealed across the bottom edge of the side walls to form a leak-proof bottom wall, so that the weight of the cooking load placed in the utensil will cause the bottom wall to stretch and conform to the top surface of a supporting surface heating means for good thermal coupling, and the principle manner of applying heat to the utensil is by thermal conduction through the resilient bottom wall.

2. A low thermal mass cooking utensil for surface cooking as recited in claim 1 wherein the said resilient plastic sheet is a fiber glass cloth impregnated with polytetrafluoroethylene.

3. A low thermal mass cooking utensil for surface cooking as recited in claim 1 wherein the said resilient plastic sheet is a polyimide material.

4. A low thermal mass cooking utensil for surface cooking as recited in claim 1 wherein the said resilient plastic sheet is an aromatic polyester material.

5. A low thermal mass cooking utensil for surface cooking as recited in claim 1 wherein the said resilient plastic sheet is a polyphenylene sulfide material.

6. A low thermal mass cooking utensil for surface cooking as recited in claim 1 wherein the said resilient plastic sheet is a polyacryl sulfone material.

7. A low thermal mass cooking utensil for surface cooking as recited in claim 1 wherein the said resilient plastic sheet includes magnetic particles that are adapted to adhere the resilient sheet to a metallic plate surface heating unit on which the utensil is to be supported for cooking purposes.

8. A low thermal mass cooking utensil for surface cooking as recited in claim 1 wherein the said side walls are formed of thin gauge aluminum of a thickness of about 0.050 inches, and the resilient plastic bottom wall is stretched tightly across the bottom edge of the side walls, and is capable of withstanding frying temperatures that may reach about 450°F.

9. A low thermal mass cooking utensil for surface cooking as recited in claim 1 wherein the said side walls are formed of foamed urethane material.

10. A low thermal mass cooking utensil for surface cooking as recited in claim 9 wherein at least the outer surface of the said side walls is metallized so as to present a metallic appearance.

11. A low thermal mass cooking utensil for surface cooking as recited in claim 8 wherein the entire inner surface of the utensil comprises a thin layer of non-stick resinous material such as polytetrafluoroethylene.

12. A low thermal mass cooking utensil for surface cooking as recited in claim 9 wherein the entire inner surface of the utensil is coated with a thin layer of non-stick resinous material such as polytetrafluoroethylene.

13. A low thermal mass cooking utensil for surface cooking as recited in claim 9 wherein the outer surface of the side walls is metallized so as to present a metallic appearance.

14. A low thermal mass cooking utensil for surface cooking as recited in claim 1 wherein the inner surface of the utensil is finished with a thin layer of non-stick resinous material such as polytetrafluoroethylene.

15. A low thermal mass cooking utensil for surface cooking as recited in claim 1 wherein the said side walls are formed of a foamed plastic material.

16. The combination of a low thermal mass cooking utensil and a low thermal mass solid plate surface heating unit, the cooking utensil comprising generally raised side walls and a high temperature flexible plastic sheet sealed across the bottom portion of the side walls to form a leakproof supporting bottom wall, the solid plate surface heating unit comprising a thin top plate as its supporting surface such that the flexible bottom wall of the utensil is adapted to conform to the top surface of the supporting plate for good thermal coupling between the utensil and the surface heating unit, and heating means cooperating with the said top plate for raising the temperature of the plate, and hence the cooking utensil that is supported thereon.

17. The combination of a low thermal mass cooking utensil and a low thermal mass solid plate surface heating unit as recited in claim 16 wherein the top plate of the surface heating unit has a slight convex formation for making a wide area thermal coupling with the flexible bottom wall of the utensil.

18. The combination of a low thermal mass cooking utensil and a low thermal mass solid plate surface heating unit as recited in claim 16 wherein the said flexible plastic sheet is capable of withstanding temperatures that may reach about 450°F.

19. The combination of a low thermal mass cooking utensil and a low thermal mass solid plate surface heating unit as recited in claim 18 wherein the said flexible plastic sheet is a fiber glass cloth impregnated with polytetrafluorethylene.

* * * * *